Dec. 10, 1935.  O. W. JOHNSON ET AL  2,023,731
COMBUSTIBLE GAS ANALYSIS APPARATUS
Filed Sept. 19, 1931   2 Sheets-Sheet 1
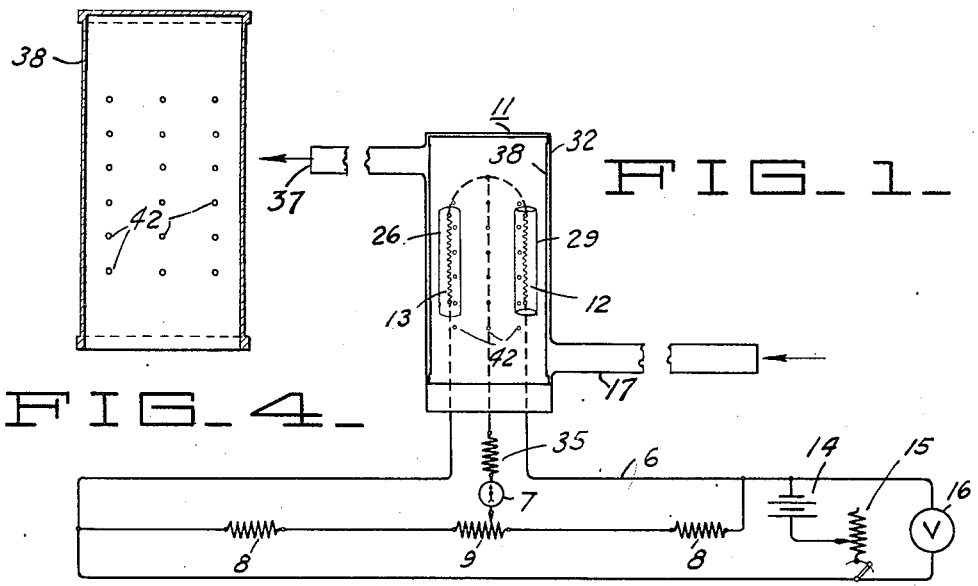
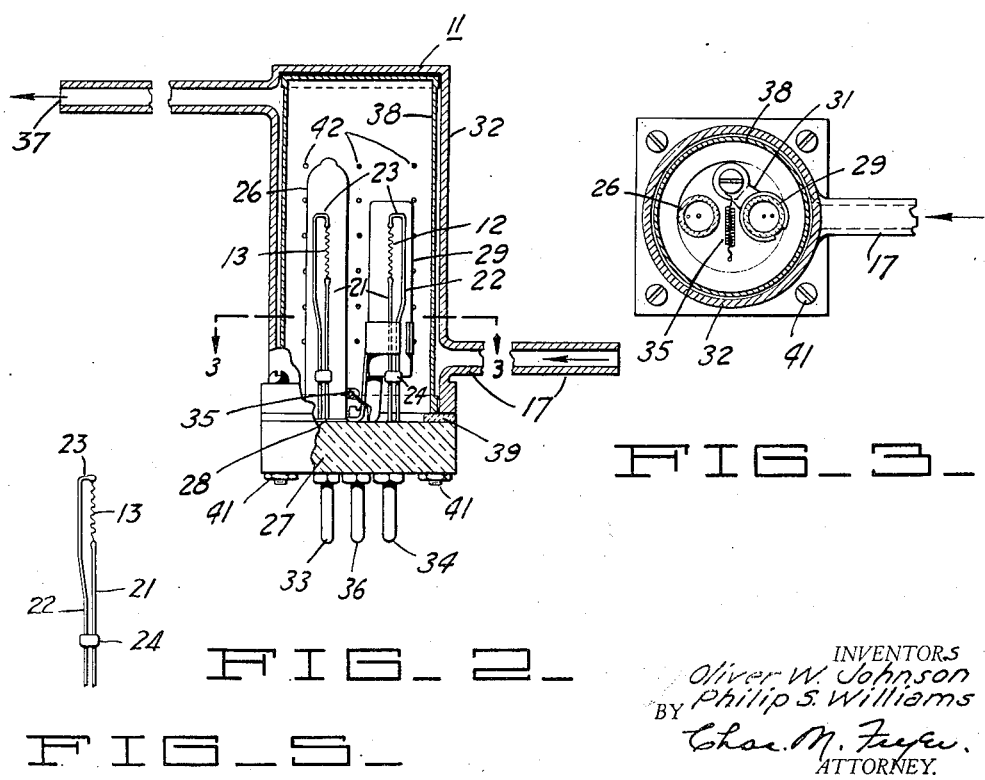
INVENTORS
Oliver W. Johnson
Philip S. Williams
BY
Chas. M. Fryer.
ATTORNEY.

Dec. 10, 1935.   O. W. JOHNSON ET AL   2,023,731
COMBUSTIBLE GAS ANALYSIS APPARATUS
Filed Sept. 19, 1931   2 Sheets-Sheet 2
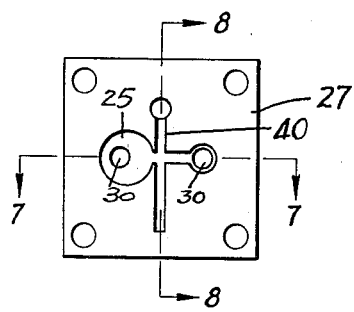
FIG_6_
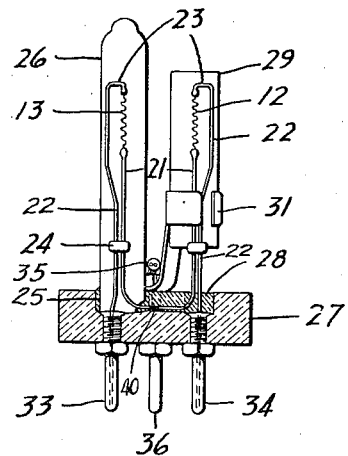  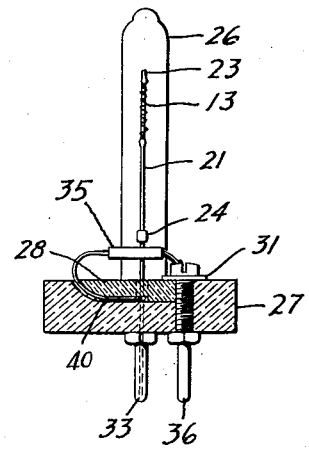
FIG_7_   FIG_8_
INVENTORS
Oliver W. Johnson.
BY Philip S. Williams.
Chas. M. Fryer.
ATTORNEY.

Patented Dec. 10, 1935

2,023,731

UNITED STATES PATENT OFFICE 2,023,731

COMBUSTIBLE GAS ANALYSIS APPARATUS

Oliver W. Johnson and Philip S. Williams, Palo Alto, Calif.

Application September 19, 1931, Serial No. 563,786

9 Claims. (Cl. 23—255)

This application is a continuation in part of our application Serial Number 284,542 filed June 11, 1928.

This invention relates to a device for measuring the percentage of combustibles in a gas and, particularly, as disclosed in our co-pending application Number 284,542, filed June 11, 1928, the "nearness to explosibility" or, as is disclosed in another co-pending application, Serial Number 563,787, filed September 19, 1931, the actual percentage of combustibles present in the gas.

The invention is applicable to the examination of gaseous mixtures including constituents reacting endothermically or exothermically. The invention has been successfully employed in examining gas mixtures including constituents oxidizable exothermically as hydrocarbons, and we will therefore preferably describe the invention as practiced in examining oxidizable hydrocarbons. However, the invention is not to be limited in application to examination of only such oxidizable or exothermically reacting mixtures since, as we have previously mentioned, it can be used on gas mixtures having endothermic reacting constituents and mixtures having exothermic reacting constituents.

The devices disclosed in these co-pending applications utilize an electrically heated filament included in a Wheatstone bridge circuit. This filament is included as an element of the electrical circuit and is adapted to have the hydrocarbon containing gas or combustible containing gas, which is to be examined, passed thereover so that, upon its change in temperature, due to the reaction of gas at or adjacent the filament surface, the filament's resistance is altered. This alteration in resistance disturbs the balance of the bridge, the relative degree of disturbance being measured or indicated upon a suitable galvanometer, such as milliammeter or millivoltmeter.

In operation, the filament is heated by the electrical current to a temperature at which it exhibits the phenomenon of surface combustion toward the gas mixture being examined. Upon the passage of a gas mixture to be examined, the filament is rapidly raised in temperature by the exothermic reaction of the constituents of the gas at the filament surface. The filament per se is of light structure, usually a thin wire, so that the gas burning at the filament surface readily increases the filament temperature, in accordance with the heat liberated by the reaction.

We have found that with prior filament constructions, the operating life of a filament was not as long as desired and was in fact, in many instances, relatively short, a matter of a few hours. In addition, certain types of prior filament construction were such that the working of the filament resulted in a "bellows action" and adjacent turns of a coiled wire were brought closer and closer together until they touched, finally to short circuit a portion of the filament. This resulted in an undesirable change in the balance of the bridge.

In accordance with this invention we have devised means for examining gas mixtures which obviates, practically entirely, the danger of shorting out of portions of the catalytic filament and which reduces the "working" of the filament, or provides for this working in a manner which obviates any serious deleterious effect upon the filament.

The previously mentioned prior constructions did not lend themselves to a cheap or ready construction and assembly nor were they sufficient to withstand any but very gentle handling. These are factors affecting the life, accuracy and trustworthiness of an instrument of the character herein considered. By means of our invention we provide a construction which is simpler to fabricate and assemble and which has demonstrated its ability to withstand successfully an inordinate amount of usage.

We have also devised a gas examination cell in which certain combinations of features, and other features, generally facilitate the speedy and accurate examination of gas mixtures. Further, with our invention, the filament is provided in such a manner that the heated filament itself can be considered as the means for drawing its own gas mixture sample and, since the temperature of the filament is relatively constant, the sample is drawn at a constant rate over the filament. This enables a more accurate analysis since the rate of combustion is not subject to variation by a rapid change in velocity in the gas.

In general the invention is concerned with the devising and improving of a combustible gas analysis apparatus to the end of increasing the life, reliability, accuracy and ease of construction and repair of the apparatus.

It is another object of the invention to devise a filament construction of such a nature that the filament can be repeatedly heated and cooled without substantially any deleterious working of the filament so it will last practically indefinitely. Filaments constructed in accordance with the present invention have lasted many thousands of operating hours and others are still giving satisfactory use after relatively long operating periods.

The invention possesses other advantageous features and objects, some of which, with the foregoing, will be set forth in the following wherein we shall outline the preferred form of gas examination apparatus of our invention. In the drawings accompanying and forming a part of this specification we have depicted a preferred form of this apparatus and details of the filament construction, but it is to be understood that various other forms thereof may be adopted, that disclosed being merely a preferred form, within the scope of the claims.

In the drawings, Figure 1 is a diagrammatic representation of an apparatus including the preferred form of examination cell and filament construction.

Figure 2 is a section taken through the preferred examination cell.

Figure 3 is a section taken on the line 3—3 of Figure 2 illustrating the arrangement of the filaments in the cell.

Figure 4 is a section through a portion of the examination cell.

Figure 5 is another form of filament construction.

Figure 6 is a plan view of a base.

Figures 7 and 8 are sections taken along the lines 7—7 and 8—8 of Figure 6, illustrating details of construction.

In brief, the apparatus with which our invention is concerned includes a filament which, when heated, changes in resistance when a reaction takes place thereon. This change in resistance is measured and, through calibration of the apparatus, percentage of reactants secured. The resistance measuring apparatus has preferably included a Wheatstone bridge circuit generally indicated at 6 containing a galvanometer 7 provided by a milliammeter or milli-voltmeter and suitable resistances 8. The galvanometer is set at a zero reading by an adjustable resistance 9 when the device is operated in an inert atmosphere as air. A reaction cell or gas examination cell, generally indicated at 11, is included which contains an exposed filament 12 and a sealed filament 13. These filaments are adapted to be heated by an electric current from a battery 14, which is controlled by a suitable resistance 15, so that a constant voltage, measured by volt meter 16, is furnished. The temperature of the filaments is thus maintained practically constant. Other means than this circuit can be used and various changes can be made in the circuit and devices employed.

The apparatus is operated, as is disclosed in our aforementioned applications, by drawing a gas to be examined into the reaction, examination or analysis cell through an inlet 17 and passed into contact with the heated combustion filament 12 so that, if reactive constituents are present in the mixture, they react on the surface of the combustion filament and thereby alter its temperature. Combustion of constituents takes place only on the heated combustion filament 12, the filament 13 being sealed out of contact with the mixture. The change of temperature of the filament 12 increases its resistance. Since the filament 13 has not been affected, the balance of the bridge is disturbed and the galvanometer gives an indication of the degree of disturbance. By calibration, the reading of the galvanometer can be utilized to indicate the percentage of a reactant such as a hydrocarbon, as is disclosed in the aforementioned application.

The repeated heating and cooling of the filament, both when the gas is passed thereover and when the filament is energized and deenergized, subject the filament to contractions and expansions which, if not properly cared for, are deleterious to the filament and the accuracy of examination. In accordance with our invention, these contractions and expansions are so handled that the undesirable working of the filament is obviated insofar as it is harmful to the life of the filament, or apt to render the gas examination inaccurate. We have found that by positioning the filament between two relatively rigid supports, arranged to provide and allow for expansion and contraction, of the filament, the filament is able to work and not have its life undesirably affected. In the form of the device shown in the drawings, the support for the filament includes a first short wire leg 21 and a second wire leg 22 which extends parallel to the short wire leg and beyond the short wire leg to be looped back upon itself, as at 23, so that the filament, such as a length of fine platinum wire, is suspended in coiled form between the adjacent, spaced rigid supports, which also provide for inclusion of the filament in the electrical circuit of the bridge. These supports form a "D", the filament forming a side thereof.

It is to be noted that the two legs extend from a common base 27 in the same direction and that a portion 23 of the longer leg 22 is looped across as in Figure 5 or across and back upon the leg 22, as is shown in Figures 2, 7, and 8. The filament 35 is thus suspended between two supports of unequal length so that when the filament is heated and the filament and supports expand, the filament, being in coiled form, is subject to a minimum of working even though the heating and cooling of the filament be repeated many thousands of times. The combination of the coiled filament and the particular leg supports avoids practically all strain on the filament, the elasticity of the coil and the compensated expansion of the support legs practically accommodating completely the natural change in size of the coil with changes in temperature. This structure (Figure 7), including the parallel support legs and coiled filament is far superior to one in which a straight wire filament is supported between like supports or opposite fixed supports (Figure 1). The leg supports disclosed are such as to have the least possible working effect on the filament and what slight working effect is present is not serious with a coiled filament although it is sufficient to cause destruction of a straight wire filament in a comparatively few hours.

When the coil expands, the legs expand in the same direction as the axis of expansion of the coil and as the longer leg 22 supports an end of the coil the net effect of the support expansion is to compensate for the expansion of the coil.

As suitable supporting wires we have utilized Dumet, as this material possesses a relatively high conductivity and accordingly is not heated appreciably by the passage of current while it has a relatively low coefficient of expansion. The wire legs are preferably fixed together by a suitable binding medium 24 such as a drop of a suitable cement placed upon the wire legs while in a plastic condition. This ensures that the supports are relatively rigid.

The sealed filament 13 is enclosed in a sealed glass tubing 26 which extends into a recess 25 in base 27, the tube 26 being sealed to the base by suitable medium as sealing wax or plaster of Paris 28. The open filament 12, over which the gas is to be passed, is preferably surrounded by a tube 29 of glass or other material, the tube being open at either end to form a vertical chimney about the filament. The tube is supported by a clip 31 secured to the base. Both of the units are fixed in substantially identical relationship to the base within a reaction chamber 32, since the filaments are thereby subject to the same conditions and physical changes. By using two filaments carried on the same base the operation and balance of the bridge is rendered more reliable and simpler to establish and maintain. The base is conveniently formed of an insulating material as bakelite.

The tube 29 is preferably of from $\frac{2}{16}$ to $\frac{3}{16}$ of an inch in internal diameter. This represents a relatively critical range covering the size of the chamber forming the chimney about the filament 12 when the filament diameter is of such a size as that of wire. The best tube size for filament diameter and length must be experimentally determined but the extreme limits are those we have given.

For inclusion in the circuit of the bridge, the wire legs 22 of each filament are preferably each joined, as by soldering, to prong connections 33 and 34 which extend through apertures 30 in the base. The prongs are fastened securely to the base. The wire legs 21, which are immediately connected to both the filaments 12 and 13, extend along a slot 40 in the base, as appears in Figures 6, 7, and 8. They are sealed in the slot by the material 28 and are joined, as by soldering, through a fixed calibrating resistance 35, carried on the base, to the head of another prong connection 36 extending through an aperture 30 and secured to the base, to secure the clip 31 also. The whole gas cell can thus be inserted as a unit into an apparatus or readily removed therefrom by means of the prong connections and unitary construction.

While the foregoing filament construction is very advantageous and obviates many of the difficulties previously encountered and results in gas analysis cells having lives of several thousand operating hours, we have found the provision of means to diffuse a supply of gas to the filament to obviate the pulsations of the pump or other gas supply means and to feed the gas to the filament without any marked directional or velocity effect. Such means enables a more accurate determination to be secured without increasing materially the complexity of the analysis cell construction.

In Figures 2, 3, and 4 we have illustrated a preferred form of this means. As is there shown, the reaction chamber 32 is provided with a gas inlet 17 and a gas outlet 37, the base 27 forming a closure for the end thereof. The inlet and outlet are preferably placed on opposite sides of the chamber and are on different levels so that a gas drawn into the chamber passes through the chamber. The passage of gas within the chamber is also preferably upwardly. This facilitates the accurate analysis of gases which tend to remain in the chamber to mix with and render subsequent samples untrue.

In prior analysis cells, the gas has merely been passed between the inlet and outlet to the chamber. Some of the gas would be swept through the tube around the open filament 12 to burn upon the surface of this filament. The rate of passage of this gas would vary with the gas and the manner of operation of the pump drawing the gas sample. The combustion rate of the gas on the filament would thus vary in an unknown manner and affect the accuracy of the determination.

In accordance with this invention we provide for the supplying of gas in such a manner that the gas does not sweep rapidly through the cell at an indeterminate and varying velocity. The gas passed into contact with the filament is so controlled that its velocity is substantially always constant when passing over the filament. The functioning of this means may be considered as cutting down the rapid velocity of the gas sweeping across the inlet to the outlet so that the gas which enters into contact with the filament is induced to do so by reason of the chimney effect of the heated filament within the tube 29 so that the gas velocity over the heated filament is definitely controlled, being that velocity induced by the presence of a hot body in a passageway, the gas velocity being changed only by a change in temperature of the filament.

The present preferred means for controlling or dampening the flow of gas has included a shell 38 of brass which was adapted to be slipped inside of the reaction chamber 32 and spaced slightly from the reaction chamber. The shell 38 and the chamber 32 are secured and sealed to the base by a gasket 39 on the base and bolts 41, thus forming a unitary construction for the cell.

This shell or gas flow dampener is fashioned with a plurality of relatively fine transverse holes 42, such as those made by a number 60 drill, so that the entrance velocity effect of the gas through the inlet is dampened and so that the jet effect of the holes is slight. These holes are provided, in one preferred and successful form, in rows of 8 holes, there being 6 rows of holes. The holes are best placed below and above the inlet and outlet so that the velocity effect of the gas, entering or leaving the chamber, is dampened out and the filament 12 is in a substantially quiescent atmosphere.

In operation, gas drawn in through the inlet strikes against the inner shell and circulates about the shell, some of the gas passing through the holes in the shell so that the gas composition within the shell is representative of the sample being examined.

It is to be noted that the holes 42 are preferably placed to have a transverse jet effect and to allow the gas to enter transversely so that the gas is not forced either downwardly or upwardly into the glass tube and thus sweep over the filament. Instead, the gas passage over the heated filament is substantially that induced by the presence of the hot filament in the confines of the tube, the filament being otherwise in a substantially quiescent atmosphere, the only change in which is that caused by each stroke of the pump or operation of the gas transfer means, which is, of course, dampened out. In this manner, the velocity effect of the gas circulated through the analysis cell is obviated and a substantially constant rate of combustion ensured.

From the foregoing we believe it will be apparent that we have disclosed a new and desirable form of gas analysis cell, and features thereof, which facilitates the rapid, accurate and reliable examination of gases having a combustible content to determine the quantity which this combustible content forms of the whole gas.

We claim:

1. In a combustible gas analysis apparatus, a chamber having an inlet and an outlet, a shell within the chamber and spaced therefrom so that gas can pass thereover from the chamber inlet to the outlet, the shell having a plurality of apertures for passing gas to the shell interior, a combustion filament within the shell upon which combustibles may burn, said filament being adapted to be heated, and a vertical open ended tube surrounding the filament for producing a chimney effect on the gas in the shell interior whereby the gas is induced to pass over the filament when the filament is heated.

2. In combination, a base, a chamber having an inlet and an outlet, an apertured shell within said chamber and spaced therefrom so that gas sweeping between said inlet and said outlet can pass about said shell, means for sealing said chamber and said shell on said base, a combustion filament in said shell upon which gaseous combustibles may burn, filament support means extending from said base to support said filament within said shell, and an open ended tube surrounding said filament and supported in a vertical position from said base with the longitudinal axis of said tube substantially coincident with the longitudinal axis of said filament.

3. In combination, a base, a chamber having an inlet and an outlet, an apertured shell within said chamber and spaced therefrom so that gas sweeping between said inlet and said outlet can pass about said shell, means for sealing said chamber and said shell on said base, two combustion filaments within said shell, filament support means extending from said base to support said filaments within said shell, an open ended tube extending substantially vertically from said base and surrounding one of said supported filaments with the longitudinal axis of said tube coincident substantially with the longitudinal axis of said filament so that combustibles may burn thereon, and a second tube sealing the other filament off from the atmosphere in said chamber and surrounding said other filament, with the longitudinal axis of said other filament coincident substantially with the longitudinal axis of said second tube.

4. A gas examination cell including a chamber having an inlet and outlet, an apertured shell in said chamber and spaced therefrom so that gas can pass thereover from said inlet to said outlet, two combustion filaments in said shell, and an open ended tube in said shell positioned vertically about one of said filaments, and means sealing off the other filament from the atmosphere in said shell.

5. A gas examination cell including a chamber having an inlet and outlet, an apertured shell in said chamber and spaced therefrom so that gas can pass thereover from said inlet to said outlet, a filament in said shell, and an open ended tube positioned vertically in said shell and surrounding said filament in said shell and of an internal diameter of from three to five sixteenths of an inch.

6. In an apparatus for examining the explosibility of a gas, an outer chamber having a gas inlet and outlet, an apertured shell within said chamber and providing a gas examination space, said shell being spaced from said chamber to permit free gas passage about the exterior thereof, a chimney positioned vertically in said shell out of axial alignment with apertures therein, and a combustion filament supported within said chimney with its axis coincident with the axis of said chimney.

7. In a gas analyzer combination, a base, a first wire filament support extending vertically from said base and having an end, a second wire filament support spaced from said first support and extending vertically from said base beyond said first wire and bent back to have its end overlie in a vertically spaced relation said first wire end, a coiled combustion filament welded to each of said ends and coiled between said ends, and a binding means of nonconducting material joining said wires together above said base.

8. In a gas analysis apparatus, means providing a substantially quiescent body of gas for analysis, an open ended tube supported vertically in said body of gas, means for supporting a filament vertically in said tube and substantially along the vertical axis of said tube, said support means including a first vertical support having an end, a second vertical support substantially parallel to but spaced from said first support and having a portion bent back to overlie in a vertically spaced relation said first support end, and a coiled combustion filament extended vertically between and joined to said ends.

9. In a gas analysis apparatus, means providing a substantially quiescent body of gas for analysis, a tube supported vertically in said body of gas, means for supporting a filament vertically in said tube and substantially along the vertical axis of said tube, said support means including a first vertical support having an end, a second vertical support substantially parallel to but spaced from said first support and having a portion bent back to overlie in a vertically spaced relation said first support end, and a coiled combustion filament extended vertically between and joined to said ends.

OLIVER W. JOHNSON.
PHILIP S. WILLIAMS.